United States Patent [19]

Saito

[11] Patent Number: 5,064,049

[45] Date of Patent: Nov. 12, 1991

[54] DEVICE FOR LINING UP PARTS

[75] Inventor: Mitsuru Saito, Tokyo, Japan

[73] Assignee: Janome Sewing Machine Co. Ltd., Tokyo, Japan

[21] Appl. No.: 606,704

[22] Filed: Oct. 31, 1990

[30] Foreign Application Priority Data

Nov. 2, 1989 [JP] Japan ................................. 1-284790

[51] Int. Cl.⁵ ............................................ B65G 47/24
[52] U.S. Cl. .................................................. 198/399
[58] Field of Search ......................... 198/399, 408, 407

[56] References Cited

U.S. PATENT DOCUMENTS 3,197,013 7/1965 Van Der Winden ............ 198/408 X
3,286,813 11/1966 Fuhrimann ........................... 198/399
4,081,069 3/1978 Ono ................................. 198/399 X Primary Examiner—Joseph E. Valenza
Assistant Examiner—Keith Dixon
Attorney, Agent, or Firm—Michael J. Striker

[57] ABSTRACT

A device for lining up parts having different shapes of upper and lower surfaces thereof and which are transported from a part feeder to a further transporting device located beneath the part feeder, includes running path conveyor with one end arranged adjacent to the part feeder, and a lining-up conveyor for transporting the parts from the running path conveyor to the further transporting device which is positioned lower than the running path conveyor. The lining-up conveyor includes two spaced rotatable rollers located, respectively, in vicinity of the another end of the running path conveyor and the further transporting device, a belt wound between the two spaced rotatable rollers and forming thereby a slop surface. The slop surface has thereon a member for catching protrudent parts formed on one of the upper and lower surfaces of the parts to thereby retain the parts on the slope surfaces. A drive is provided for driving the belt in a direction opposite to a descending direction of the belt. A running part extends along the slope surface below a lower run of the belt for receiving parts turned over by the belt.

5 Claims, 5 Drawing Sheets

22: Adjusting switch

22a: Inclination enlarging switch

22b: Inclination contracting switch

20: Start-stop switch

26: Adjusted value memory

21: Indication lamp

30: CPU

25: Adjusting motor control means

1: Parts feeder

24: Motor control means

15: Adjusting motor 2a, 4a: Drive motor

11: Line-up motor

DEVICE FOR LINING UP PARTS

FIELD OF THE INVENTION

The present invention relates to a device for lining up parts with respect to upper and lower surfaces thereof.

BACKGROUND OF THE INVENTION

The parts which have different shapes of the upper and lower surfaces, should be regularly lined up for processing on either one of the upper or lower surfaces thereof.

There have conventionally been proposed various kinds of devices which line up parts based on the shapes of the parts.

For example, Japanese Patent Laid Open No. 55-93722 discloses a device which evaluates the shapes of upper or rear sides of the parts, and turns over the parts if upper sides are non-desired ones.

However, since the upper and lower surfaces of the parts are evaluated by shapes thereof, the evaluations depend upon the shapes of the parts. Such a device is useful for the manufacturing of single parts, but could not be used for parts having the same or similar shapes on both surfaces

SUMMARY OF THE INVENTION

It is therefore an object of this invention to provide a lining-up device for parts having different shapes on upper and lower surfaces.

The present device includes a first part running path means connected to a part feeder device with a lot of parts having different shapes at upper and lower surfaces thereof a pair of rotating rollers and a lining-up belt wound thereon serve as a lining-up device placed between said first parts running path means and a second part running path means which is positioned to be lower than said first part running path means. Therefore, the lining-up belt has a slope which is provided with means for catching the parts by protrudent portions formed on either of surfaces of the parts having different shapes a a drive motor drives said rotating roller in a direction opposite to a descending direction of said lining-up belt; and a running means is disposed along the lining-up belt beneath the lower surface of said lining-up belt to receive the parts which are turned over by said lining-up belt.

The parts fed from the first part running path means are fed onto the catching surface of the slope lining-up belt. Since the lining-up belt moves upward, and if the parts positioned thereon have faces thereof having protruded portions facing upward, such parts slide down along the slope of the lining-up belt toward the second part running path means, and are lined up thereon with the protruded portions facing upward.

On the other hand, if the parts positioned on the lining up belt have faces thereof having protruded facing downward, such parts catch the surface of the lining-up belt and move upward, and turn around the upper rotating roller.

By this turning, the position of the upper and lower surfaces of the parts is reversed on the lining-up path, and the parts slide down on the slope with the protruded portions facing upward and lined up on the second part running path means.

The present invention both as to its construction so to its method of operation, together with additional objects and advantages thereof, will be best understood from the following detailed description of the preferred embodiments when with reference to the accompanying drawings.

DETAILED DESCRIPTION OF THE PREFERRED EMBODIMENTS

Explanations will be made to embodiments of the present invention with reference to the attached drawings.

In the present embodiment, parts 18 having different shapes of the upper and lower surfaces should be regularly lined up with respect to the upper and lower surfaces thereof. Burrs are formed at one sides of the parts after they have been drawn out from a pressing process, and are to be removed. Explanations will be made emphatically on the lining-up operation with protrudent parts facing upward.

Figure 1:
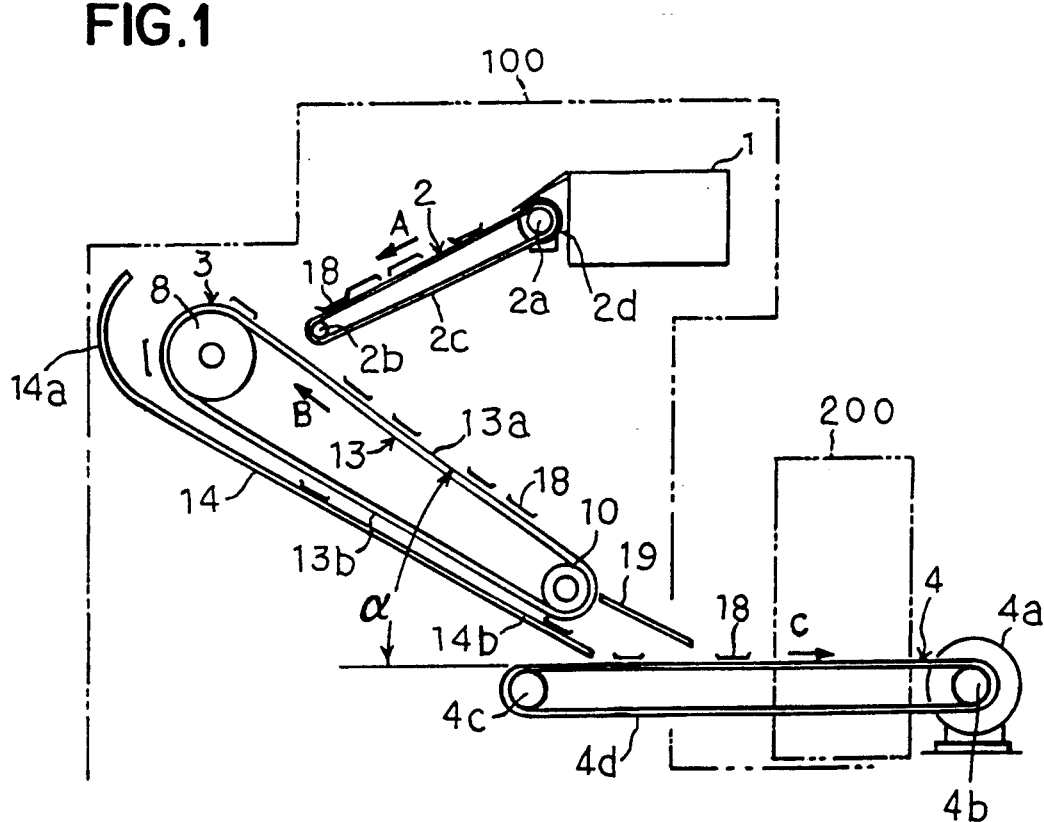
FIG. 1 is an elevational side view of a device for lining up parts according to the present invention.

In FIG. 1, a reference numeral 1 designates a known part feeder placed on a lining-up table 100, in which the pressed parts 18 are enclosed irregularly and at random.

The reference numeral 2 designates a first part running path, where a feed belt 2c is wound on a pair of rollers 2a, 2b, and is moved in an arrow A direction by a drive motor 2d connected with one of the rollers.

One of the rollers (2a) is positioned under an outlet of the part feeder 1, while the other power roller (2b) is positioned above a lining-up means 3 but lower than said one roller 2a, thereby with forming a moderate inclination.

The numeral 4 designates a second part running path which is includes a roller 4b connected to a drive motor 4a and a feed belt 4d wound on a coupled roller 4c so as to feed the parts 18 to a burr remover 200 which is positioned downstream of the lining-up means 3, so that the parts 18 on the belt 4d are moved in an arrow C direction.

The lining-up means 3 will be explained in detail with reference to FIGS. 2 and 3.

The lining-up table 100 is provided with a support shaft 5 located between upright parts 100a, 100b thereof, and the support shaft 5 is mounted for joint rotation with a roller supporter 7 integrally secured with a worm wheel 6.

The roller supporter 7 is connected at its one end with a roller shaft 9 which rotatably supports a coupled roller 8.

A drive roller 10 mounted on the support shaft 5, is integrally secured to a drive gear 10a. The drive gear 10a is in mesh with a gear 12 which is fixed on an output shaft of a lining-up motor 11 mounted on the lining-up table 100 so as to transfer the rotation of the lining-up motor 11 to the drive gear 10a.

Between the drive roller 10 and the coupled roller 8 positioned upstream with respect thereto a lining-up belt 13 is wound which is formed on the surface thereof with an endless emery cloth having large friction coefficient.

The numeral 14 designates a part receptacle path which is arranged along the slope of a lower side 13b of the lining-up belt 13, and is fixed on the roller supporter 7. The receptacle path 14 is formed at its upper end with a portion 14a which circumscribes the outer circumference of the coupled roller 8, while the path 14 is formed at its lower end with a chute portion 14b which guides the parts onto a supply belt 4d.

The worm wheel 6 fixed on the roller supporter 7 engages a worm 16 mounted on the output shaft of an adjusting motor 15 carried on the lining-up table 100.

The numeral 17 designates a positioning shaft whose one end is formed with a threaded portion 17a and other end is held by the roller supporter 7.

The upright part 100a of the lining-up table 100 has an arc shaped opening 100c circumscribing the support shaft 5, and the positioning shaft 17 is movable placed within said opening.

A nut 23 screwed onto the threaded portion 17a formed at the end of said positioning shaft 17, retains the positioning shaft against rotation relative to the roller supporter 7.

A supporter 2e of the roller supporter 7 rotatably supports a pair of rollers 2a, 2b of said first part running path means 2.

One side of the supply roller supporter 2e is supported by the lining-up table 100, and the other side is pivotally supported with respect to said one side. A support pin 2f is secured to said supporter 2e, and is fitted at a forked portion 7a defined in the roller supporter 7.

Figure 4:
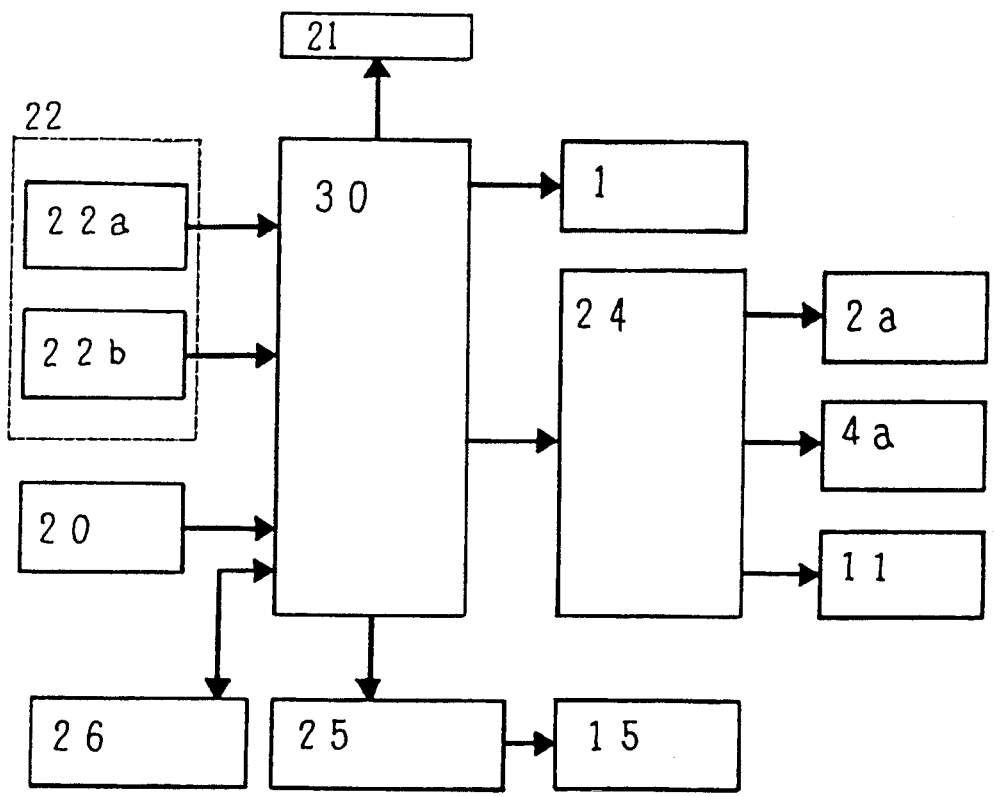
FIG. 4 is an explanatory diagrammatic view of a drive control device.

FIG. 4 shows a control device where there are, in an operating board (not shown), a start-stop switch 20 which, by operation, starts and stops the parts feeder 1, the drive motor 2d, the drive motor 4a and the line-up motor 11, respectively, and an indication lamp 21 which lights at starting to indicate an operation.

The drive motor 2d, the drive motor 4a and the line-up motor 11 are connected to a central processing unit 30 via a motor drive control means 24 so as to start the operation in order of the drive motor 4a, the line-up motor 11 and the drive motor 2d in response to the starting operation of the start-stop switch 20, and start the part feeder 1. The stop is operated in order of the part feeder 1, the drive motor 2d, the line-up motor 11 and the drive motor 4a.

An adjusting switch 22 is composed of switch 22a and a switch 22b, with the switch 22a used to enlarge an inclination angle of the lining-up belt 13 (to FIG. 1) relative to a belt 4d of the second part running path, and the switch 22b used to reduce the inclination angle $\alpha$.

An adjusting motor 15 is connected to the central processing unit 30 via a drive control means 25 of the adjusting motor 15.

A memory means 26 of adjustment controlled values is connected to the central processing unit 30, and stores inclination angle $\alpha$ in correspondence to the parts to thereby read out the stored values in succession and control the adjusting motor 15 by the operation of the adjusting switch 22.

Figure 5:
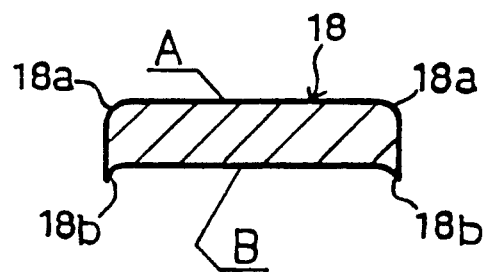
FIG. 5 is a cross-sectional view showing a shape of a part after the part has been drawn out from a pressing device.

The part 18 has, as seen in FIG. 5, a burr side A with a portion 18a formed during pressing, and a burr side B with a portion 18b.

Accordingly, the part 18 fed from the parts feeder 1 to the first path 2 are positioned thereon with the A sides and the B sides facing upwards at random, respectively.

The upper side 13a of the lining-up belt 13 is the endless emery cloth having large friction coefficient, and moves in an upward direction (B). When the parts 18 are transferred under a condition that the burr sides B are faced upwards (i.e., the burr sides A are faced downwards), the friction coefficient between the burr sides A and the lining-up belt 13 is small, so that such parts slide down on the slope surface of the belt 13, and moved onto the belt 4d of the second part running path 4 via a chute 19 arranged at the extension of the upper side 13a of the lining-up belt 13, on the belt 4d of the second part running path 4. The parts 18 are sent in an arrow C direction to a subsequent burring machine 200

On the other hand, when the parts 18 are transferred from the first parts running path 2 to the lining-up belt 13 under a condition that the burr sides B face downwards, the burr portions 18b contact with the upper side 13a of the lining-up belt having the large friction coefficient, so that such parts do not slide but halt thereon.

Accordingly, the parts 18 move in the direction of arrow B of the lining-up belt 13 and turn around the outer circumference of the coupled roller 8, and fall onto the part 14a for turning over the parts surrounding the outer circumference of the coupled roller 8.

Subsequently, following the reversing chute 14b, the burr sides B are placed facing upward on the belt 4d of the second part running path 4, and the parts 18 are moved in the arrow C direction.

Namely, although the part 18 sent from the parts feeder 1 with the burr side B facing downward, they are lined up with the burr sides B turned upward.

Whether the parts 18 halt on the lining-up belt 13 and are turned over or slide down thereon when they are fed with the burr sides B faced downward, is determined by the growing amount of the burrs of the parts 18 at being drawn, the friction coefficient relative with the lining up belt 13 and the inclination angle $\alpha$ of the lining-up belt 13.

If the friction coefficient is largely changed by the growing amount of the burrs caused by drawing, shapes and weights of the parts 18, the inclination angle $\alpha$ of the lining-up belt 13 is adjusted.

Figure 2:
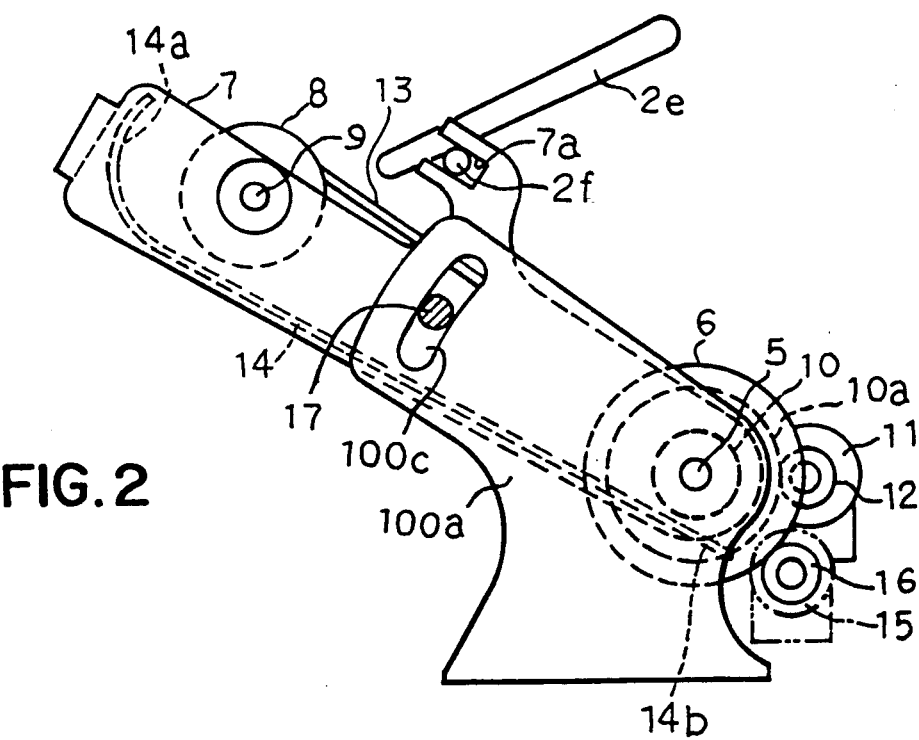
FIG. 2 is a side view of a structure of a lining-up means.
Figure 3:
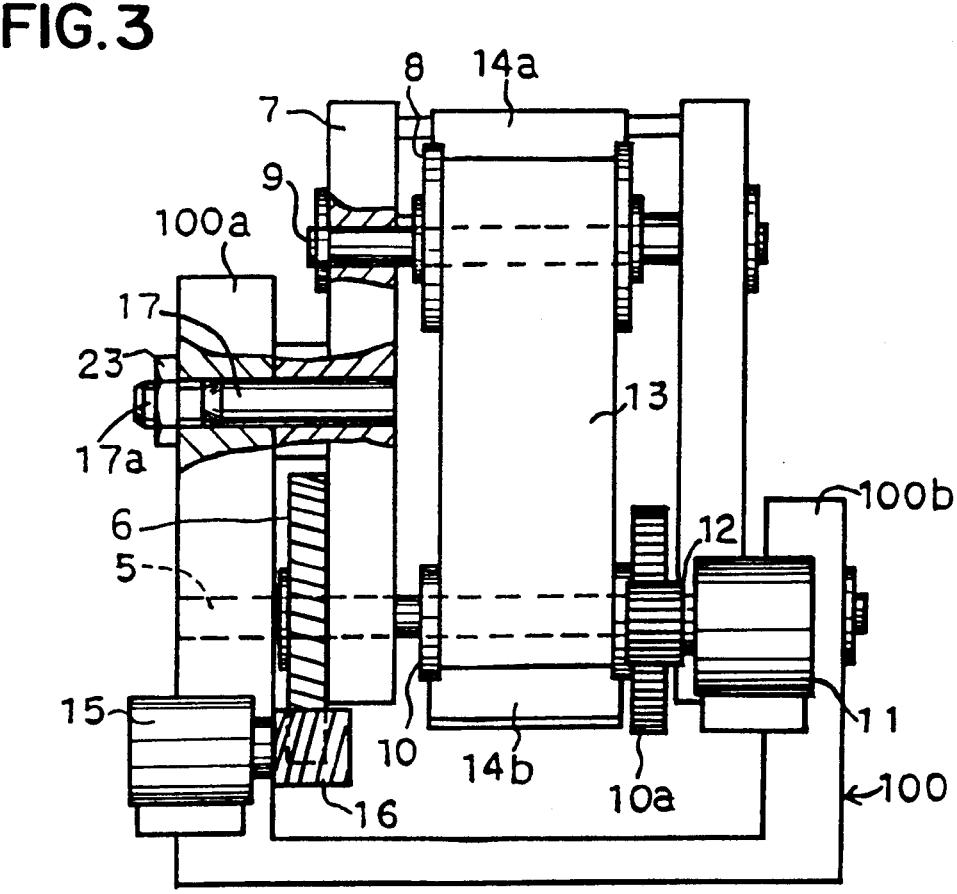
FIG. 3 is a front partially cross-sectional view of the structure shown in FIG. 2.

Then the nut 23 shown in FIGS. 2 and 3 is loosened, and either of their inclination enlarging switch 22a and the inclination reducing switch 22b is operated to drive the adjusting motor 15.

The worm wheel 6 engaging the worm 16 is rotated by the adjusting motor 15 to rotate the roller supporter 7 with respect to the supporting shaft 5 and adjust it at a desired inclination angle $\alpha$, and the nut 23 is again tightened.

Figure 6A:
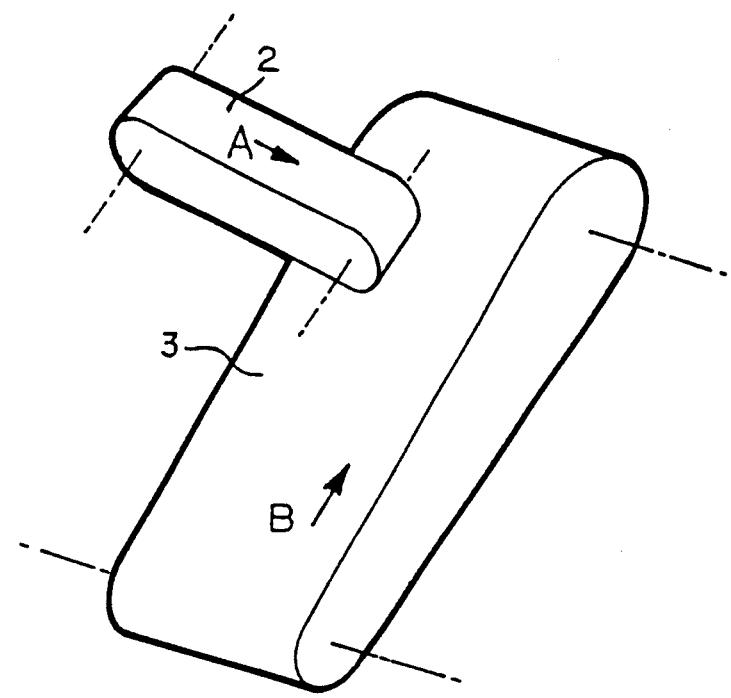
FIGS. 6(a) and 6(b) are explanatory view showing relative positions of feed means relative to the lining-up means.
Figure 6B:
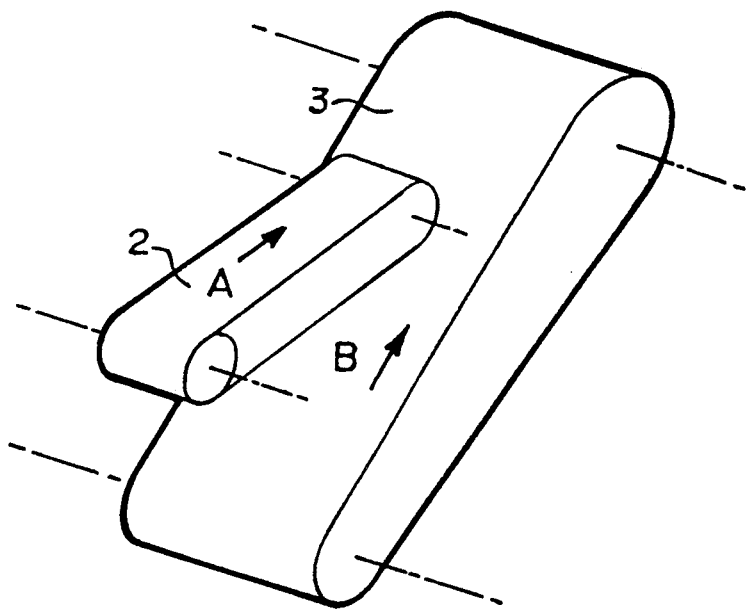

The present embodiment shows, as seen in FIG. 6(b), that the first parts running path 2 feeds the parts in the direction of arrow A that coincides with the direction B of the lining-up belt 13, but as shown in FIG. 6(a), it is also possible to feed the parts when the direction A is transverse to the direction B.

Figure 6C:
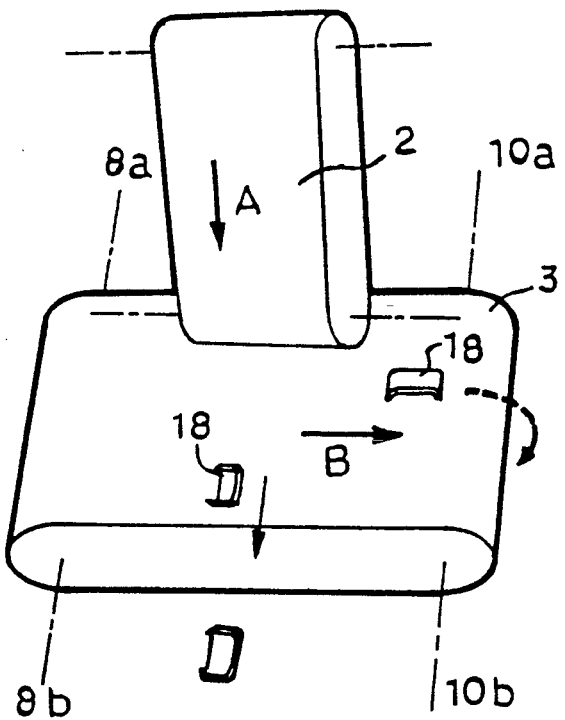
FIGS. 6(c) and 6(d) are explanatory view showing movement of parts on the lining-up means.
Figure 6D:
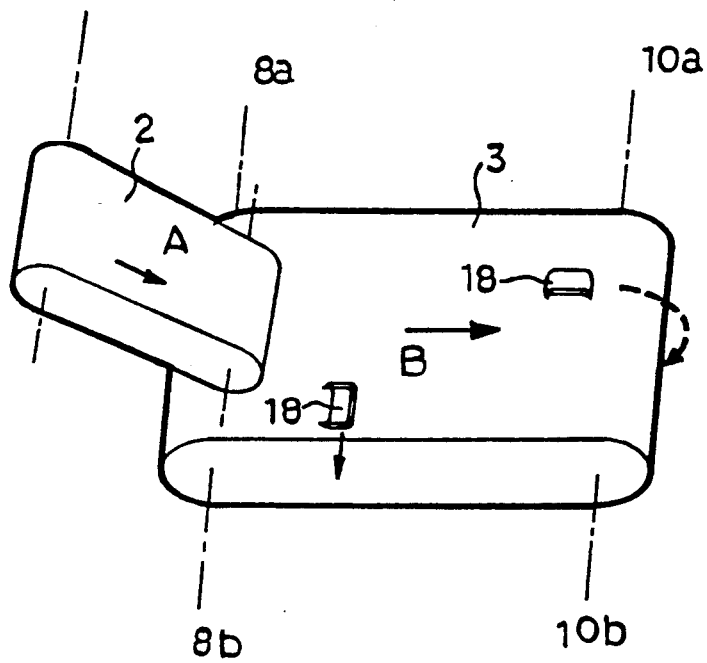

As shown in FIGS. 6(c) and (d), the inclination angle of the lining-up belt 13 is tilted such that the sides 8a, 10a of the rotation rollers are elevated relation to the other sides 8b, 10b thereof, and the lining-up belt 13 is moved in a direction transverse to the inclination.

In this case, if the parts 18 are fed with the sides B having the burrs 18b facing upward, they slide in the direction transverse to the moving direction B of the lining-up belt 13.

On the other hand, if the parts 18 are fed with the sides B being faced downward, they move in the moving direction B of the lining-up belt 13.

Similarly as stated above, the parts 18 advance along the rotation roller 10 and are turned over the path 14, so that they are lined up with the sides B having the drawn burrs 18b facing upward on the second running path 4.

As mentioned above, according to the present invention, the part fed from the first parts running path, are sent onto the lining-up belt having a slope surface resulting form pivoting of the rotation roller of the part lining-up means at the lower position thereof.

The lining-up belt has the surface for contacting the protruded burrs formed on either of the upper and lower surfaces of the parts. The parts which are sent with the burrs facing upward, slide down along the slope surface of the lining-up belt, and are lined up with the burrs being faced upward on the second parts running path.

On the other hand, the parts which are sent with the burrs being faced downward, catch the surface of the lining-up belt, whereby the parts advance from the lower side to the upper side of the lining-up belt, and turn around the rotation roller at the upper position.

By turning, the upper and lower surfaces of the parts are reversed with respect to the part lining-up running path, and slide down with the burrs facing upward, so that they are lined up in the same manner on the second part running path.

According to the present invention, the means for lining up the upper and lower surfaces of the parts, are evaluated by the catching conditions of the upper and lower surfaces, and therefore the practice of the invention is not limited to the shapes of the parts as the prior art does.

It is not necessary to design multi-typed holes for discriminating each of the parts as having conventionally been practised. The present invention is available to changings of various kinds, small lot articles and others.

Accordingly, the lining-up device for stamping parts in the press shop may be standardized, thereby to enable to reduce installing areas of the devices and save changings of facilities.

While the invention has been illustrated and described as embodied in a device for lining up parts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for lining up parts having different shapes of upper and lower surfaces thereof and transported from a part feeder to a further transporting device located beneath said part feeder, said lining-up device comprising part running path means having one end arranged adjacent to the part feeder; and means for lining up the parts and transporting the parts from said part running path means to the further transporting device which is positioned lower than said part running path means, said lining-up and transporting means including two spaced rotatable rollers located, respectively, in vicinity of another end of said part running path means and the further transporting device, a belt wound between said two spaced rotatable rollers and forming thereby a slope surface on its upper run, said belt having means thereon for catching protrudent parts formed on the lower surface portion of the belt and permitting the parts with protrudent parts formed on the upper surfaces of the parts to slide down the slope surface to the further transporting means of the parts to thereby retain the parts on the slope surfaces, drive means for driving said belt in a direction of said slope surface opposite to a descending direction of said belt, and means extending along said slope surface below a lower run of said belt for receiving parts turned over by said belt.

2. A device as claimed in claim 1, wherein said part running path means extends transverse to a longitudinal direction of said belt.

3. A device as claimed in claim 1, wherein said catching means has a large friction coefficient with respect to the parts.

4. A device as claimed in claim 3, wherein said catching means comprises an emory cloth.

5. A device as claimed in claim 1, further comprising means for adjusting a slope angle of said belt.

* * * * *